P. T. LINDHARD.
ROTARY KILN.
APPLICATION FILED SEPT. 15, 1910.
1,008,974.
Patented Nov. 14, 1911.
6 SHEETS—SHEET 1.
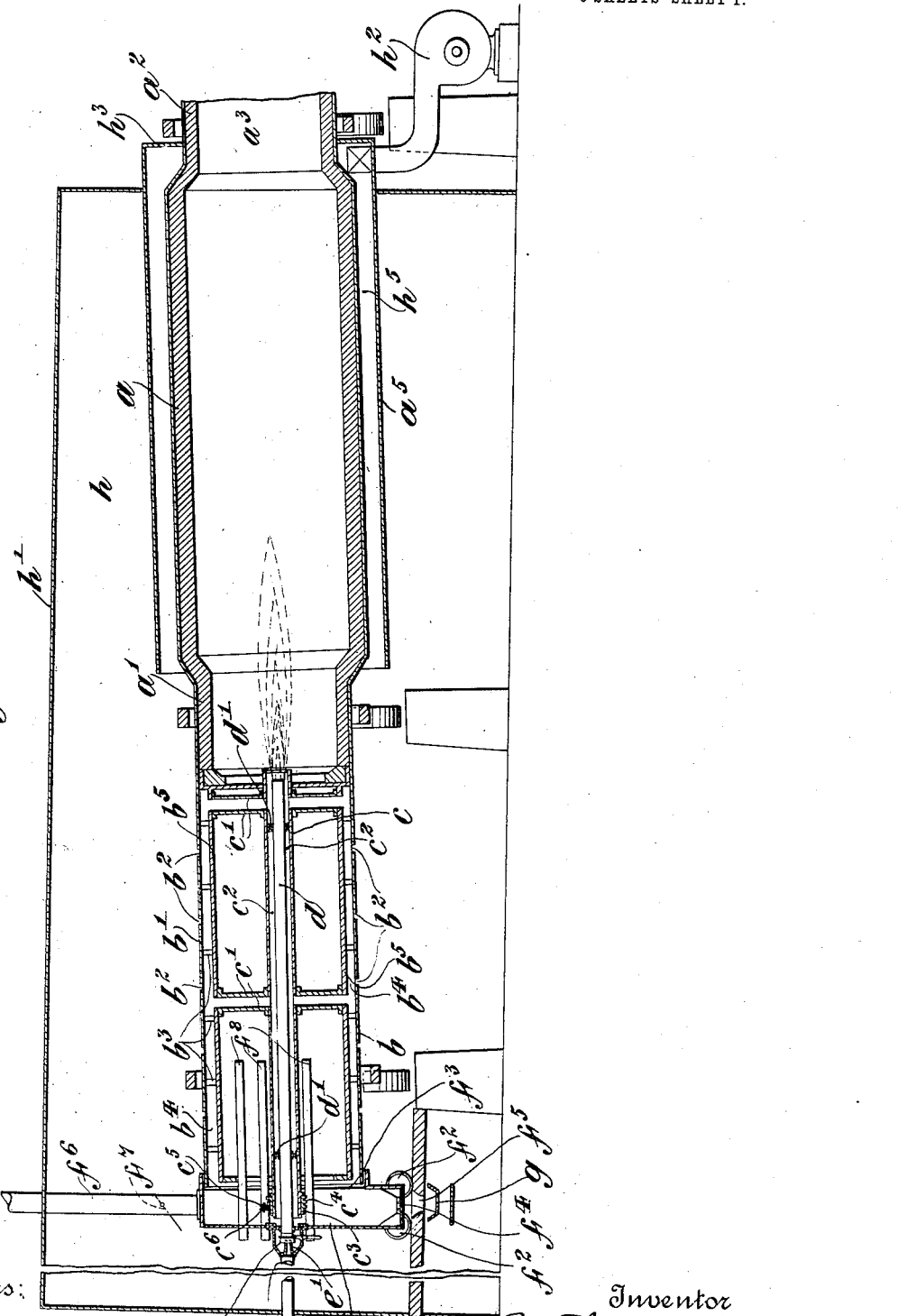

P. T. LINDHARD.
ROTARY KILN.
APPLICATION FILED SEPT. 15, 1910.
1,008,974.
Patented Nov. 14, 1911.
6 SHEETS—SHEET 2.
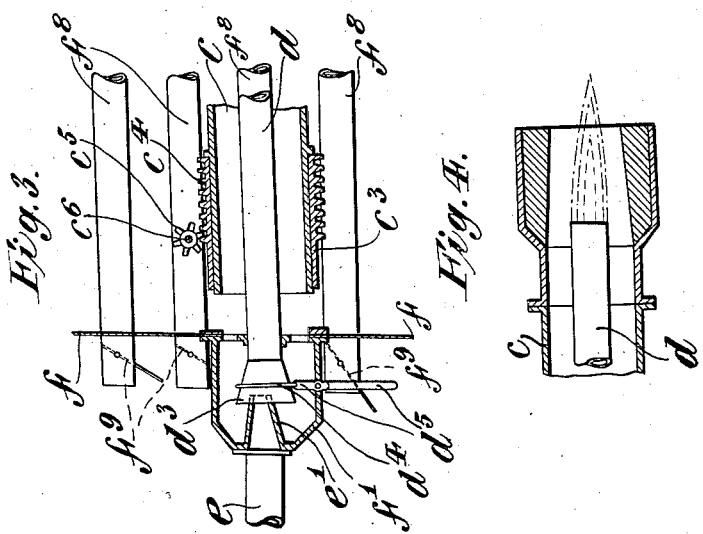
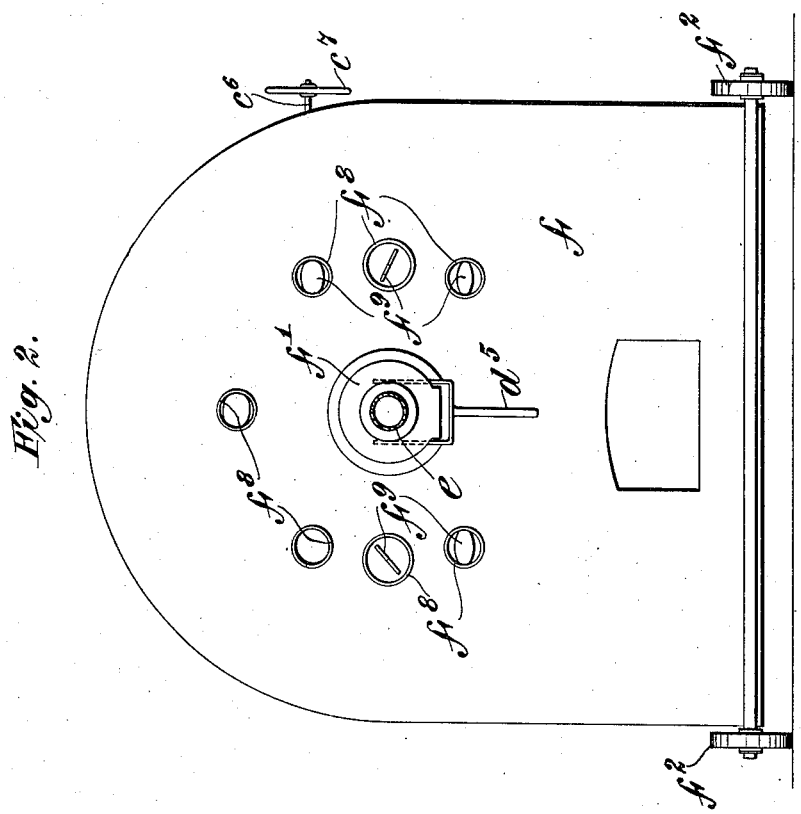

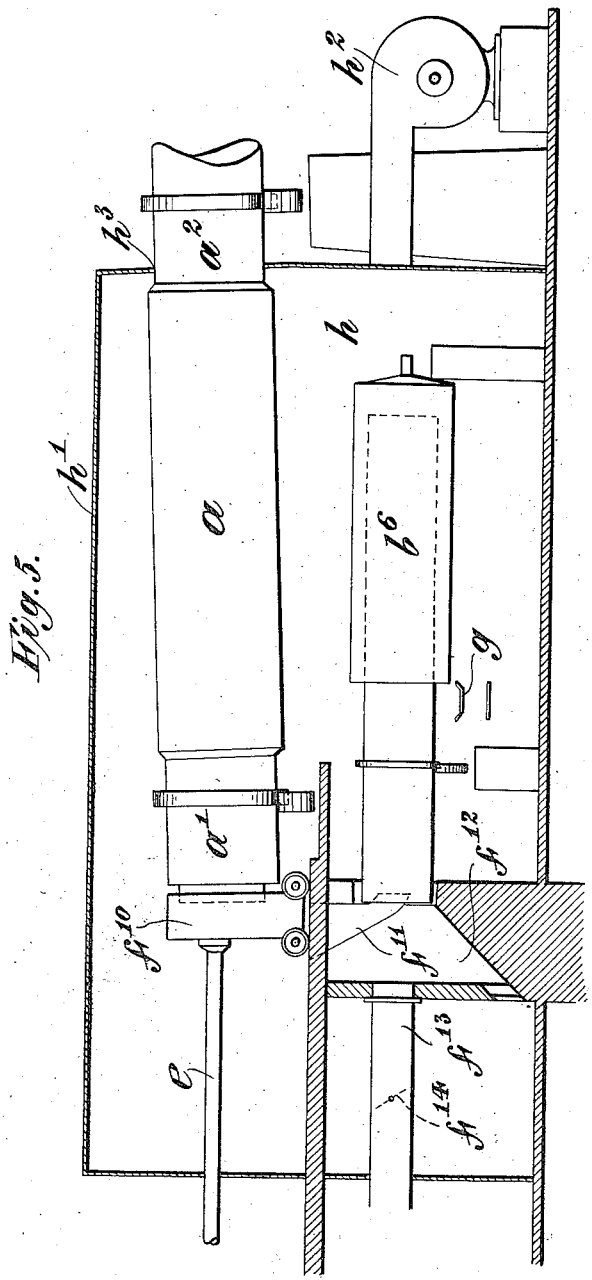

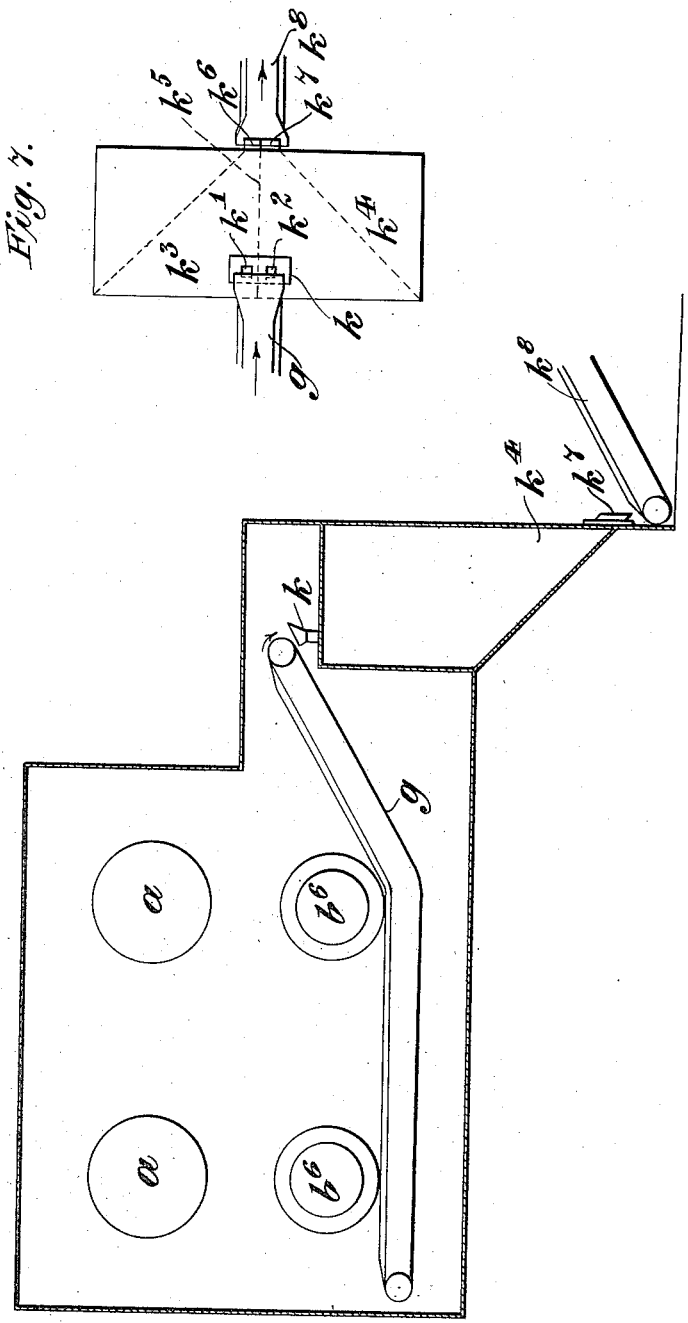

P. T. LINDHARD.
ROTARY KILN.
APPLICATION FILED SEPT. 15, 1910.
1,008,974.
Patented Nov. 14, 1911.
6 SHEETS—SHEET 5.
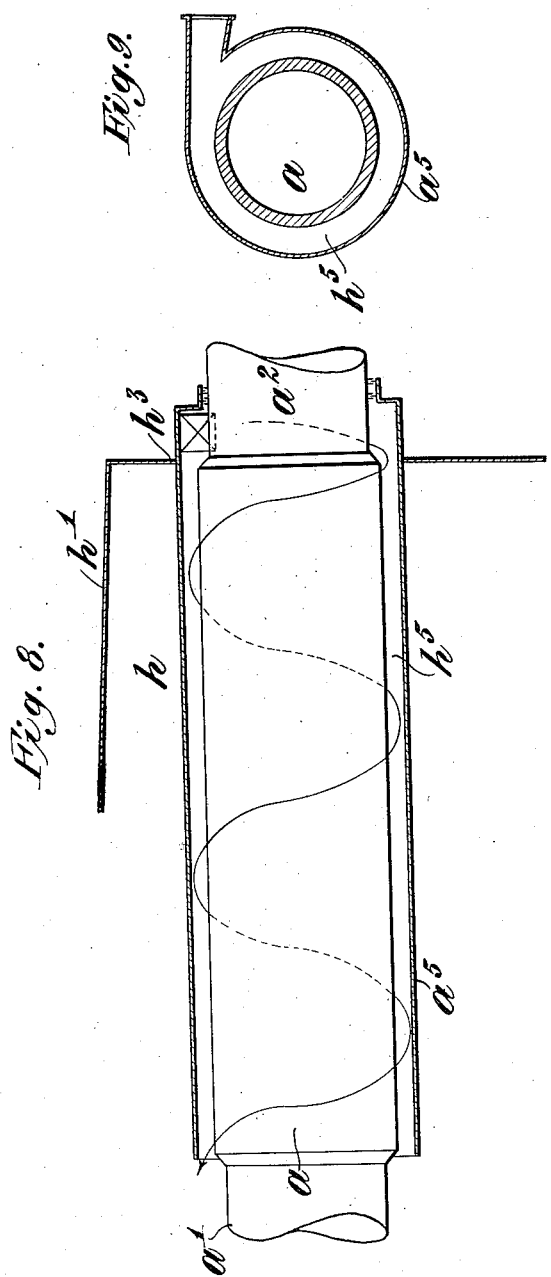

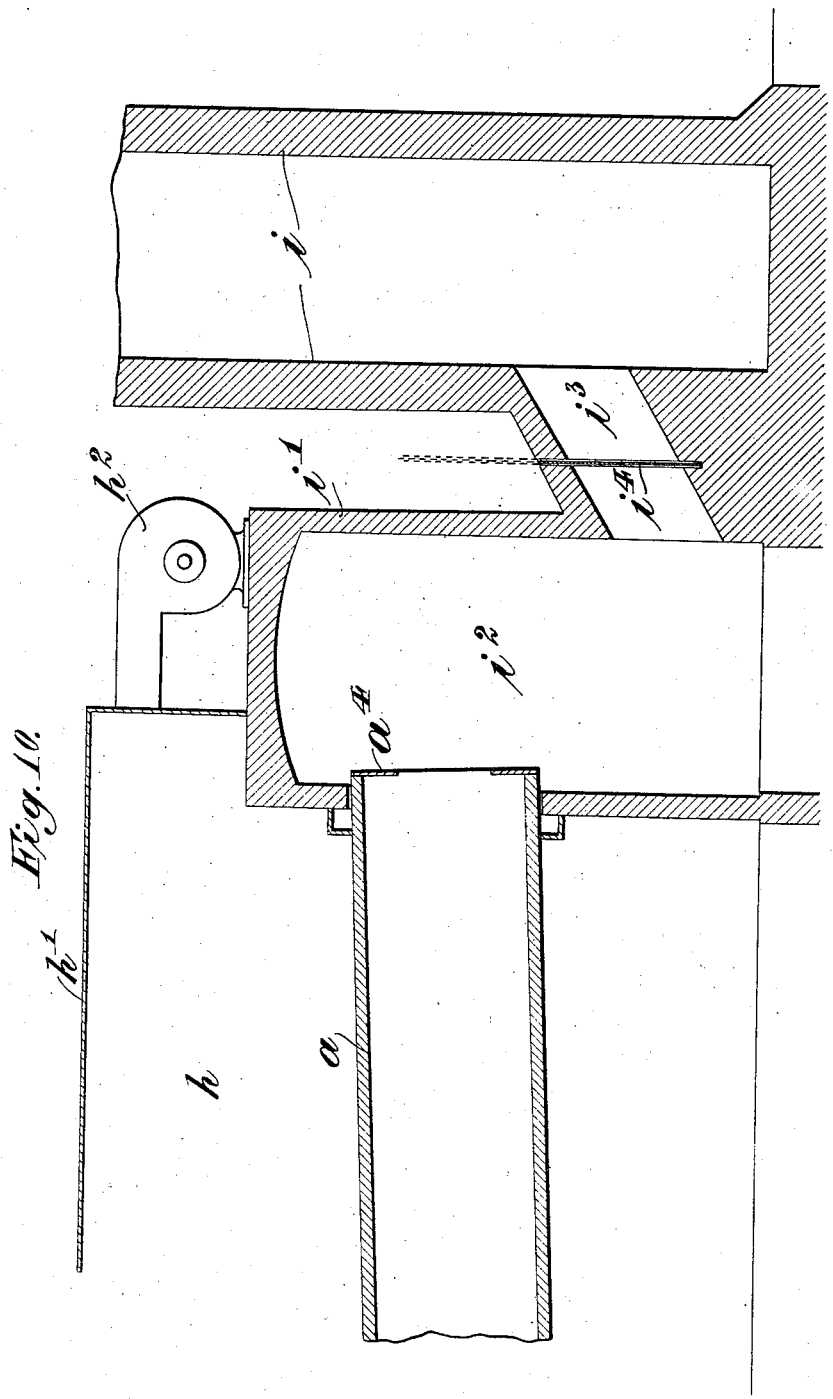

UNITED STATES PATENT OFFICE.

POVL T. LINDHARD, OF NEW YORK, N. Y., ASSIGNOR TO F. L. SMIDTH & CO., OF NEW YORK, N. Y., A CORPORATION OF NEW JERSEY.

ROTARY KILN.

1,008,974.  Specification of Letters Patent.  Patented Nov. 14, 1911.

Application filed September 15, 1910. Serial No. 582,268.

*To all whom it may concern:*

Be it known that I, POVL T. LINDHARD, a subject of the King of Denmark, residing at Flatbush, in the borough of Brooklyn of the city of New York, in the State of New York, have invented certain new and useful Improvements in Rotary Kilns, of which the following is a specification, reference being had to the accompanying drawings, forming a part hereof.

This invention relates to rotary kilns for the burning of cement and other materials in which the powdered, gaseous or liquid fuel is supplied under pressure at the lower or discharge end of the kiln. The capacity of such kilns is largely dependent upon the amount of fuel which can be burned in the kiln in a given time and this again is dependent upon the amount of air which is supplied to sustain combustion in the kiln. Heretofore one or the other of two different methods has been employed for the purpose of increasing the volume of air supplied to the kiln in order to increase the capacity of the kiln. The method employed in the early stages of the art was the increase of the natural draft by tall stacks into which the products of combustion were discharged, but the practicable height of the stacks placed a limit upon the possible increase of draft and moreover involved much expense in construction. In the later development of the art the method of increasing the volume of air was by forced draft, the discharge end of the kiln being closed by a hood to which air was supplied under pressure from a blower, the air thus supplied being sometimes preheated by contact with the burned materials discharged from the lower end of the kiln, such materials being cooled at the same time. The hood or closure thus employed is movable in order to permit access to the interior of the kiln when necessary. The coolers in which the burned materials are cooled and the air is preheated are usually rotating cylinders either placed beneath the kiln or formed as an extension thereof. It is difficult to make the joints between the hood and the kiln and between the hood and the cooler sufficiently tight to prevent escape of the hot gases when forced draft is employed without interfering with the necessary freedom of movement of the parts. Furthermore, the escape of the hot gases from the kiln into the stack having been unrestricted the pressure in the zone of combustion within the kiln could not be increased so as to realize the advantages of higher temperature and more economical combustion to be secured by carrying on combustion in a relatively denser atmosphere. Moreover, with the old arrangements, it has not been practicable, by reason of the impossibility of preheating the air sufficiently, to use the coolers arranged as extensions or continuations of the kilns, which otherwise offer some advantages.

This invention relates particularly to kilns in which forced draft is employed, whether the coolers are arranged below the kilns or as extensions thereof and has for its principal objects to provide for the employment of forced draft under higher pressure than has been possible hitherto without excessive leakage, to provide for the maintenance of a higher pressure in the zone of combustion within the kiln than has been practicable hitherto, and to provide for the preheating of the air to a higher temperature than has been possible hitherto especially when the coolers are arranged as extensions of the kilns.

Still another object is to provide for the removal of the burned material without loss of air pressure.

The invention also has for its object to improve the construction of the rotary kilns in various particulars as will appear more clearly hereinafter.

The invention will be explained with reference to the several embodiments thereof which have been chosen for illustration in the accompanying drawings, and in which—

Figure 1 is a view in longitudinal section showing a rotary kiln and a cooler arranged as an extension thereof, constructed in accordance with the invention. Fig. 2 is a view in elevation, on a larger scale than Fig. 1, of the movable hood or closure. Fig. 3 is a detail view, partly in longitudinal section, showing particularly the construction of the injector through which the fuel and the additional air are introduced. Fig. 4 is a detail view showing the burner end of the fuel tube. Fig. 5 is a view partly in longitudinal section and partly in elevation, showing the cooler arranged below the kiln. Fig. 6 is a view partly in end elevation and partly in transverse section, illustrating particularly the provisions for permitting the removal of the burned material without loss of air pressure. Fig. 7 is a detail top view of some of the parts shown in Fig. 6. Figs. 8 and 9 are detail views illustrating the device for preheating the air and at the same time for cooling externally the combustion zone of the kiln, also shown in Fig. 1. Fig. 10 is a detail view in longitudinal section showing the extension of the outer casing to include the base or a portion of the base of the stack.

Referring first to the constructions shown in Figs. 1, 2 and 3, the rotary kiln $a$, supported and rotated in the usual manner, and having at its discharge end a portion $a'$ of reduced diameter, as compared with the main body or combustion zone of the kiln, is also shown as having its other end also reduced in diameter; as at $a^2$ in Fig. 1, or as having its gas outlet $a^3$ reduced or restricted by an annulus $a^4$ as shown in Fig. 10. The purpose in thus restricting the gas outlet of the kiln, whether by either of the devices shown or by any other means, is to make it possible to increase thereby the pressure within the combustion zone of the kiln and so secure the advantages of higher temperature and more economical combustion by causing the combustion to be carried on in a relatively denser atmosphere. The cooler $b$, in this arrangement, is shown as a continuation or extension of the kiln from the discharge end, that is, the end through which the burned material is discharged, so that such burned material passes directly from the kiln into the cooler with the same direction of movement. The cooler comprises a shell $b'$ having perforations $b^2$ through which the air may be admitted to absorb heat from the cooler, being thereby preheated and at the same time cooling the burned material in the cooler. Within the shell $b'$ and secured thereto by suitable brackets $b^3$, so as to form an air space $b^4$, is a lining $b^5$ open at its ends to receive the burned material from the kiln $a$ and to discharge the same when sufficiently cooled. A tube $c$ is centrally disposed within the lining $b^5$ and is supported therefrom by hollow arms $c'$ which establish communication between the air space $b^4$, outside of the lining $b^5$, and the air space $c^2$ within the tube $c$, which is also open at its lower end to receive air and at its upper end to admit air to the kiln. The fuel pipe $d$, through which the powdered, gaseous or liquid fuel is supplied under pressure to the burning zone of the kiln, is supported centrally within the tube $c$, as by brackets $d'$, so as to provide an air space between the fuel pipe and the surrounding tube $c$, the fuel pipe being adjustable longitudinally within the tube $c$.

For the purpose of regulating the admission of air to the lower end of the tube $c$, the latter may be provided at its lower end with a longitudinally movable sleeve $c^3$ having thereon rack teeth $c^4$ adapted to be engaged by a pinion $c^5$ carried by a shaft $c^6$ which extends through the side wall of the movable hood hereinafter referred to and is provided with a hand wheel $c^7$ so that the sleeve $c^3$ may be shifted from time to time as required.

The external fuel pipe $e$ is provided at its extremity with a nozzle $e'$, preferably tapered as shown, to enter more or less the flaring end $d^3$ of the inner fuel pipe $d$, thus forming an injector by which an inflow of air into the fuel pipe $d$, to mix with the powdered, gaseous or liquid fuel therein, is induced by the flow of the fuel through the nozzle under pressure from its source of supply. The injector is regulated by the longitudinal adjustment of the fuel pipe $d$, which is shown as having an external flange $d^4$ engaged by a forked lever $d^5$, suitably mounted in the cap $f'$ of the hood or closure $f$.

The hood or closure $f$ is shown as mounted upon wheels or rollers $f^2$, so as to be readily movable into and out of position and as having in its rear face an opening $f^3$ to receive the end of the cooler $b$, so that the burned material may be discharged from the cooler into the hood and thence through an opening $f^4$ in the bottom thereof and through an opening $f^5$ in the floor on which it rests, into a conveyer $g$ which may be of usual construction as shown more particularly in Fig. 6. The hood is also shown as provided with an air escape pipe $f^6$, fitted with a damper $f^7$, so that the escape of air from the hood may be regulated as desired. The hood is also shown as supporting tubes $f^8$ which are extended some distance into the cooler and are provided each with a damper $f^9$ so that if the supply of relatively cool air to the cooler through the perforations $b^2$ in its outer wall is not sufficient to effect the necessary cooling of the material, additional air may be admitted for this purpose through the pipes $f^8$.

In order that air may be supplied to the kiln at any desired pressure without escape of the hot gases at any point, the kiln and the cooler are inclosed within a chamber $h$ formed by a casing $h'$, air under pressure being supplied to the chamber $h$ from any suitable source, such as a blower $h^2$.

As shown in Figs. 1, 5 and 8 the casing $h'$ does not extend to the stack-end of the kiln $a$, a joint being formed, as at $h^3$, around the kiln. As the chamber $h$ is filled with atmospheric air under pressure from the source of supply, there can be leakage of air only and not of heated gases at the joint $h^3$. Therefore there can be no burning of the metal around the joint nor loss of heated gases and the necessary pressure can be maintained by operating the blower at a sufficient speed to counteract the loss of pressure alone. Should it be desired, however, to prevent the loss of pressure, the casing $h'$ can be extended to inclose also a portion of the base $i'$ of the stack $i$, as shown in Fig. 10. In this figure the kiln $a$ having its gas outlet restricted by an annulus $a^4$, as already described, is shown as extended into a dust chamber $i^2$ which is connected with the stack $i$ through a passage $i^3$ which may be provided with a damper $i^4$ for the purpose of further regulating the pressure within the kiln.

In Figs. 5 and 10 the blower $h^2$ is shown as communicating directly with the chamber $h$, but it may be arranged to discharge air through a passage $h^5$ formed between the kiln $a$ and a stationary shell $a^5$, as represented in Figs. 1, 8 and 9. This arrangement provides not only for the heating of the air before it enters the chamber $h$, but also for the better cooling of the kiln itself externally in the combustion zone and the consequent retardation of destruction of the lining of the kiln by the intense heat developed in the zone of combustion.

In Fig. 1 the cooler is shown as an extension of the kiln while both are inclosed within the casing $h'$. Obviously, both the cooler and the kiln may be inclosed within the casing $h'$ when the cooler is disposed below the kiln. Such an arrangement is shown in Figs. 5 and 7, in which the kiln $a$ is mounted as usual and is provided with a hood $f^{10}$ and an external fuel pipe $e$. The cooler $b^6$, which is here shown as of ordinary construction, is disposed below the kiln and is adapted to receive the burned material therefrom through a chute $f^{11}$, while the air which enters the cooler from the surrounding chamber $h$ passes upward through the chute $f^{11}$ or through the dust chamber $f^{12}$ into the hood and thence into the kiln $a$. An air pipe $f^{13}$ is shown as provided with a damper $f^{14}$ by which the admission of cool air to the dust chamber may be regulated. As before, the casing $h'$ incloses the kiln, the cooler and the hood and the air pressure maintained in such chamber prevents the escape of heated gases at any point.

Figs. 6 and 7 illustrate particularly the devices for permitting the removal of the burned material from time to time without loss of air pressure. In Fig. 6, the cooler $b^6$ is shown as disposed below the kiln $a$ and a bench of two kilns and two coolers is indicated, but obviously the device for removing the burned material, which is discharged from the cooler in either instance, may be employed in connection with the extended cooler shown in Fig. 1 as well as with the cooler placed as shown in Fig. 7. The conveyer $g$, shown in Figs. 1 and 5 as well as in Fig. 6, may be of any suitable construction. It receives the burned material from the cooler and delivers it, through a double chute $k$, provided with separate valves or closures $k'$, $k^2$, into one or the other of two bins $k^3$, $k^4$, separated by a partition $k^5$. The bins $k^3$, $k^4$ are adapted to discharge the material received therein through separate gates $k^6$, $k^7$ into a common receptacle or to a common conveyer $k^8$. When one of the bins has been filled, its receiving opening may be closed and its discharge gate opened to permit the removal of the burned material therefrom without loss of air pressure, the material being discharged by the conveyer $g$ meanwhile into the other of the two bins, the receiving opening of which is open while its discharge gate is closed.

Various modifications in construction and arrangement will readily suggest themselves in view of the foregoing and it is to be understood, therefore, that the invention is not restricted to the particular construction and arrangement shown.

I claim as my invention:

1. The combination of a kiln, a rotary cooler, a casing inclosing a substantial portion of the kiln and the cooler, and means to supply air under pressure within the casing.

2. The combination of a kiln, a cooler, a hood, a casing inclosing a substantial portion of the kiln, the cooler and the hood, and means to supply air under pressure within the casing.

3. The combination of a kiln, a casing inclosing a substantial portion of the kiln, means to supply air under pressure within the casing and means to restrict the gas outlet from the kiln.

4. The combination of a kiln, a casing inclosing a substantial portion of the kiln, means to supply air under pressure within the casing, a double bin provided with gates for each part, and means to conduct the burned material from the kiln to the double bin.

5. The combination of a kiln, a cooler, a casing inclosing a substantial portion of the kiln and the cooler, means to supply air under pressure within the casing, a double bin provided with gates for each part, and a conveyer to conduct the burned material from the cooler to the double bin.

6. The combination of a kiln, a casing inclosing a substantial portion of the kiln, and means to supply air under pressure within the casing.

7. The combination of a kiln, a casing inclosing a substantial portion of the kiln, a shell surrounding the kiln within the casing and forming an air passage around the kiln, said passage communicating with the chamber formed by the casing, and means to supply air under pressure within the casing.

8. The combination of a kiln, a cooler, a casing inclosing a substantial portion of the kiln and the cooler, a stationary shell surrounding the kiln within the casing and forming an air passage around the kiln, said passage communicating with the chamber formed by the casing and means to supply air under pressure to said passage.

9. The combination of a kiln, a cooler formed as an extension of the kiln, a casing inclosing a substantial portion of the kiln and the cooler, and means to supply air under pressure within the casing.

10. The combination of a kiln, a cooler formed as an extension of the kiln, a hood closing the discharge end of the cooler, a casing inclosing a substantial portion of the kiln, the cooler and the hood, and means to supply air under pressure within the casing.

11. The combination of a kiln, a cooler formed as an extension of the kiln, means to restrict the gas outlet from the kiln, a casing inclosing a substantial portion of the kiln and the cooler and means to supply air under pressure within the casing.

12. The combination of a kiln, a cooler formed as an extension of the kiln, the cooler comprising an outer perforated shell and an inner shell with an air passage between them, and means to supply air under pressure to the perforations of the outer shell.

13. The combination of a kiln, a cooler formed as an extension of the kiln and comprising an outer shell and an inner shell forming an air passage between them, the outer shell being perforated, a centrally disposed tube extended through the cooler to the combustion zone of the kiln and a fuel pipe extended centrally through said tube with an air passage between.

14. The combination of a kiln, a cooler formed as an extension of the kiln and comprising an outer shell and an inner shell forming an air passage between them, the outer shell being perforated, a centrally disposed tube extended through the cooler to the combustion zone of the kiln, a fuel pipe extended centrally through said tube with an air passage between and tubular arms supporting said centrally disposed tube and establishing communication between the air passage between the inner and outer shells and the air passage between the fuel pipe and the inner tube.

15. The combination of a kiln, a cooler formed as an extension of the kiln, a hood closing the discharge end of the cooler, a fuel pipe extended through the hood and centrally through the cooler to the combustion zone of the kiln and air admission pipes extended through the hood into the cooler.

16. The combination of a kiln, a cooler forming an extension of the kiln, a hood closing the discharge end of the cooler, an external fuel pipe having a nozzle within the hood, and an internal fuel pipe extended through the cooler to the combustion zone of the kiln and having an open inlet end into which the nozzle of the external fuel pipe is directed and into which air is drawn from the cooler by the fuel blast.

17. The combination of a kiln, a cooler forming an extension of the kiln, a hood closing the discharge end of the cooler, an external fuel pipe having a nozzle within the hood, an internal fuel pipe extended through the cooler to the combustion zone of the kiln and having an open inlet end into which the nozzle of the external fuel pipe is directed and into which air is drawn from the cooler by the fuel blast, and means to shift the inner fuel pipe longitudinally with respect to the nozzle of the external fuel pipe.

18. The combination of a kiln, a cooler formed as an extension of the kiln, a tube extended through the cooler to the combustion zone of the kiln, a fuel pipe extended centrally through said tube with an air passage between, and means to supply air under pressure to said tube.

19. The combination of a kiln, a cooler formed as an extension of the kiln, a hood closing the end of the cooler, a tube extended from a point near the hood through the cooler to the combustion zone of the kiln and a fuel pipe extended from the hood through said tube to the combustion zone of the kiln.

20. The combination of a kiln, a cooler formed as an extension of the kiln, a hood closing the end of the cooler, a tube extended from a point near the hood through the cooler to the combustion zone of the kiln, a fuel pipe extended from the hood through said tube to the combustion zone of the kiln, and a sleeve movable longitudinally on the end of the tube adjacent to the hood to regulate the admission of air from the cooler to the tube.

21. The combination of a kiln, a cooler, a hood closing the end of the cooler, a tube extended through the cooler from a point near the hood, a fuel pipe extended through said tube from the hood and means to supply air under pressure to the cooler.

22. The combination of a kiln, a cooler, a hood closing the end of the cooler, a tube extended through the cooler from a point near the hood, an open ended internal fuel pipe extended through said tube and communicating with the interior of the cooler, and an external fuel pipe terminating within the hood in a nozzle directed into the open end of the internal fuel pipe.

23. The combination of a kiln, a cooler, a hood closing the discharge end thereof, a tube extended through the cooler from a point near the hood and communicating with the interior of the cooler near the hood, a fuel pipe extended through said tube, and a sleeve movable longitudinally on the end of said tube to regulate the admission of air from the cooler to the tube.

24. The combination of a kiln, a cooler, a hood, an open ended internal fuel pipe communicating with the interior of the cooler and extended forward from the hood, said fuel pipe being movable longitudinally and an external fuel pipe having a nozzle within the hood directed into the open end of the internal fuel pipe.

25. The combination of a kiln, a cooler formed as an extension of the kiln, a hood closing the end of the cooler, a casing inclosing the cooler and the hood, and means to supply air under pressure within the casing.

This specification signed and witnessed this 30th day of July, A. D., 1910.

POVL T. LINDHARD.

Signed in the presence of—
AMBROSE L. O'SHEA,
N. A. SMITH.